United States Patent [19]

Davis et al.

[11] Patent Number: 4,753,732
[45] Date of Patent: Jun. 28, 1988

[54] METHOD OF STRIPPING DYES FROM HIGH-BOILING NON-IONIC MEDIA

[75] Inventors: James K. Davis; Robert W. Connelly, both of Greensboro, N.C.

[73] Assignee: Burlington Industries, Inc., Greensboro, N.C.

[21] Appl. No.: 38,495

[22] Filed: Apr. 15, 1987

[51] Int. Cl.$^4$ ............................................. B01D 11/04
[52] U.S. Cl. ................................................... 210/634
[58] Field of Search ...................... 8/440, 506; 210/634

[56] References Cited

U.S. PATENT DOCUMENTS

| | | | |
|---|---|---|---|
| 4,047,889 | 9/1977 | Hermes | 8/440 |
| 4,165,217 | 8/1979 | Kitamura et al. | 8/440 |
| 4,529,405 | 7/1985 | Wilson | 8/506 X |

Primary Examiner—Frank Spear
Attorney, Agent, or Firm—Nixon & Vanderhye

[57] ABSTRACT

Dyes are removed from waterless dye compositions by mixing the dyeing composition, composed of one or more dyes in a high-boiling, nonionic liquid, with an extraction solvent that is immiscible with the high-boiling liquid, yet solubilizes the dye. The dye laden extraction solvent is separated as a separate phase from the high-boiling, nonionic liquid medium.

11 Claims, 1 Drawing Sheet

METHOD OF STRIPPING DYES FROM HIGH-BOILING NON-IONIC MEDIA

DESCRIPTION OF THE INVENTION

1. Technical Field

This application relates to waterless dye compositions for textiles and other thermoplastic articles and the procedures for removing dyes from these compositions in order that they may be reused with a dye of a different shade. More specifically, the invention relates to a process for decolorizing or substantially decolorizing waterless dye compositions composed of high-boiling, non-ionic media.

2. Background of the Invention

The dyeing of textile articles and other three dimensional thermoplastic articles using waterless dye compositions based essentially on high-boiling, non-ionic media containing a tinctorial amount of dyestuff is the subject of numerous U.S. patents including U.S. Pat. Nos. 4,293,305, 4,394,126 and 4,529,405 all in the name of Wilson. These waterless dye compositions are applied to the article to be dyed at elevated temperatures for relatively brief periods of time, optionally in an inert environment, then removed from the dyed article. Because of the expense of these waterless dye compositions and possible environmental concerns, the compositions are reused for subsequent dyeing procedures with the same or a different shade dye. Recycled waterless dye compositions may eventually require the inclusion of additional make-up dye in the composition or it may be desirable to change the shade of the dye composition. To do so it is necessary to decolorize the non-ionic high-boiling media and for this purpose the art has traditionally taught the use of using activated carbon as the decolorizing agent; see U.S. Pat. No. 4,529,405 to Wilson at column 7, lines 26-30. Dyeing articles with waterless dye compositions based upon high-boiling non-ionic media is sometimes referred to as an entrainment dyeing process.

DETAILED DESCRIPTION OF THE INVENTION

Figure 1:
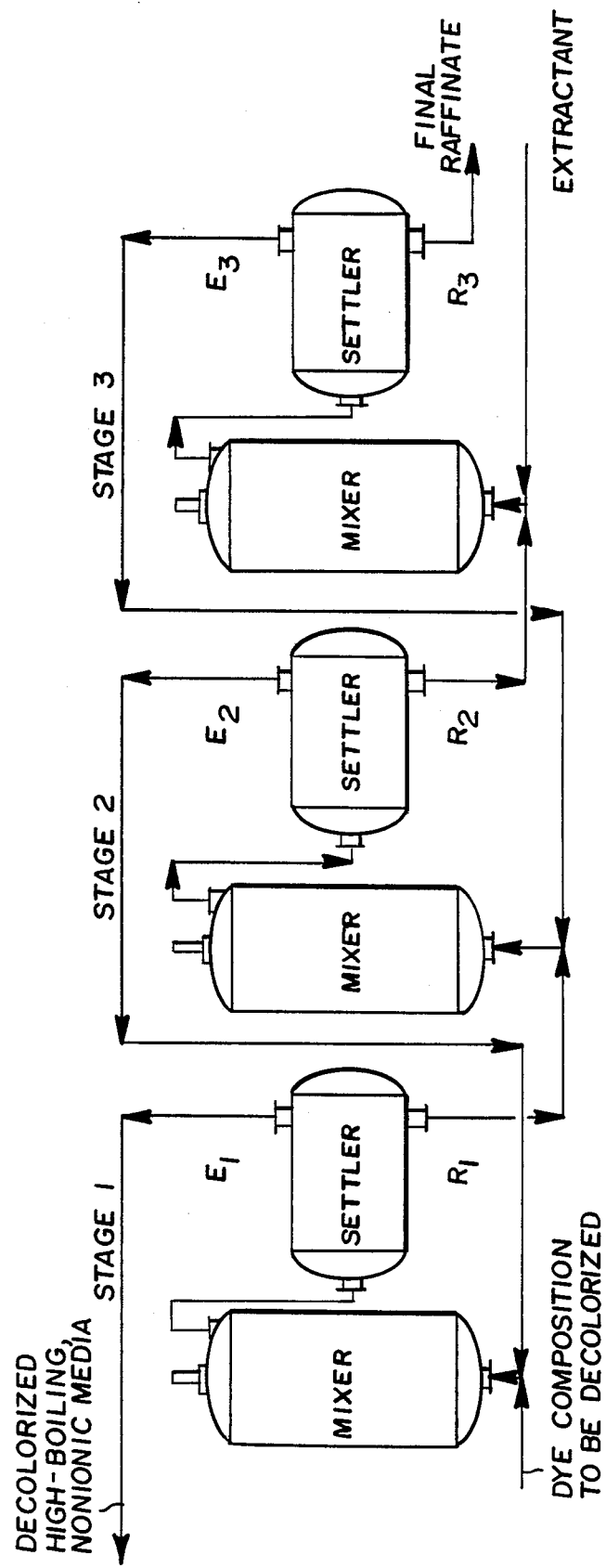
FIG. 1 is a flow diagram of a 3-stage countercurrent mixer-settler extraction cascade. The extraction device consists of a series of stages; three are illustrated in this drawing, each composed of a mixture and a settler.

During the entrainment dyeing process it becomes necessary at some point to strip the dyes out of the high-boiling non-ionic dyeing medium in order to reuse this fluid. The fluid is expensive and there are environmental concerns as to its disposal. The prefered method at present is to decolorize this dye/fluid solution through a carbon bed described as in the Wilson patent noted above. This is a very costly process because the dyes are adsorbed on the carbon and cannot be recovered and reused, hence are lost, and it is very difficult to reuse the carbon beds.

An object of this invention is to provide a means of stripping the major portion of the dyes out of a high-boiling dyeing medium using a liquid/liquid extraction process. Any remaining dye is removed using the traditional carbon bed technique, if necessary. This process permits lower carbon bed usage and allows dyes to be recovered and reused as a base for building shades.

The process of this invention includes stripping and removing these dyes with a liquid/liquid extraction using dimethyl sulfoxide (DMSO) by mixing the liquid dye composition with the extraction solvent. Any similar extraction solvent in which the dyestuffs have high solubility, and which is essentially immiscible with the high-boiling dyeing medium may be used, as explained below. After the liquid/liquid contacting step, the solution is allowed settle into two distinct phases. The DMSO phase is heavier and sinks to the bottom for easy removal. It was found that an opaque, high-boiling dyeing medium containing 2.5% of dye by weight could be stripped to a translucent solution of much lower dye content with a single extraction with an equal volume of DMSO. The dyes are removed from the DMSO by evaporation.

A preferred high-boiling dyeing medium particularly suited to extraction with DMSO is tris(2-ethylhexyl)-trimellitate; however the process is believed to be applicable to any high-boiling, nonionic solvent liquid/dye system as further defined below.

The main advantages of the process of this invention include reducing overall cost of the dyeing operations, since the DMSO is recoverable and can be easily recycled and reused. The use of carbon beds, as may be required, is reduced and the recovered dyes are reused, at least to a limited extent. Thus, the amount of money lost when the fluid has to be stripped is reduced.

The attached FIGURE is a schematic representation of a series of three extraction units, called a cascade, suited for carrying out the process of this invention. As shown in this FIGURE, the dye composition to be decolorized is introduced to the first mixer where it is thoroughly mixed with the extraction solvent. The mixture is directed to the first settler, allowed to separate into two phases and the decolorized high-boiling, non-ionic medium is removed from the top via line $E_1$ while the dye-contaminated extraction solvent is removed from the lower portion of the settler via $R_1$. This process is repeated two additional times in the embodiment illustrated in the drawing. Further stages may be included, we have used as many as four, but a point will be reached where the equipment expense and operational cost are no longer justified by the level of dye removal obtained.

As indicated, a high-boiling, nonionic organic medium is one component of the dye composition amenable to the decolorizing process of this invention, and by this we mean a composition that remains stable within the temperature range of from about 50° F. to about 450° F. Such high-boiling, nonionic organic media, sometimes called solvents, are described in the patent literature and elsewhere as vehicles or solvents for dyestuffs and pigments and are used as the major component for waterless dyeing compositions. See, for example, U.S. Pat. No. 4,155,054 to Hermes describing the use of glycol or glycol ethers as high-boiling liquids for waterless dyeing and heatsetting of textiles as well as the aromatic esters and cycloaliphatic diesters disclosed in U.S. Pat. No. 4,293,305 to Wilson.

The preferred aromatic esters can be of the formula $ArCOOR_2$, $ArCOO-R_1-OOCAr$ or $(ArCOO)_2-R_3$, where $R_1$ is alkylene of 2-8 carbon atoms or polyoxyalkylene of the formula $-C_rH_{2r})_s$, in which r is 2 or 3 and s is up to 15; $R_2$ is substituted or unsubstituted alkyl or alkenyl of 8-30 atoms; $R_3$ is the residue of a polyhydric alcohol having z hydroxyl groups; Ar in mono- or bicyclic aryl of up to 15 carbon atoms and z is 3-6.

Furthermore the cycloaliphatic ester can be of the formula:

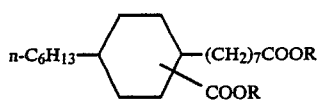

wherein R is substituted or unsubstituted straight or branched chain alkyl of 4-20 carbon atoms, polyoxyalkylene of the formula R' $(OC_xH_{2x})_n$ or phosphated polyoxyalkylene of the formula:

or a salt thereof, wherein $(OC_xH_{2x}O)_n$ is $(C_2H_4O)_n$—, $(C_3H_6O)_n$— or $(C_2H_4O)_p$, or $(C_3H_6O)_q$—; $R^1$ is H or ArCO; Ar is mono- or bicyclic aryl of up to 15 carbon atoms; x is 2 or 3; n is 2-22 and the sum of p+q is n.

The preferred high-boiling, nonionic organic solvents include triesters of 1,2,4-benzenetricarboxylic acid, also known as trimellitic acid. Preferred esters are tris(2-ethylhexyl)trimellitate (sometimes referred to for convenience as "TET"), trisisodecyl trimellitate, trisisooctyl trimellitate, tridecyl trimellitate, and trihexadecyl trimellitate. It will be understood that mixed esters such as hexyl, octyl, decyl trimellitate can also be used. Most preferred is tris(2-ethylhexyl)trimellitate (CAS No. 3319-31-1), also known as trioctyl trimellitate, which can be purchased from Eastman Chemical Products, Inc., Kingsport, Tenn., as Kodaflex® TOTM.

Other solvents/organic media amenable to the decolorizing process of this invention include, among others, those described in U.S. Pat. Nos. 4,293,305; 4,394,126; 4,426,297; 4,581,035; 4,602,916; 4,608,056; and 4,609,375. The preparation of the materials described above is given in U.S. Pat. No. 4,529,405, the disclosure of which is herein incorporated by reference.

BEST MODE OF CARRYING OUT THE INVENTION

The invention is further described with respect to these following specific operational parameters and procedures, it being understood that these are presented for purposes of illustration and not limitation. Unless otherwise indicated all parts and percentages are by weight and temperatures reported in degrees F.

Repeat solvent extractions were conducted with a 3% solution of crude Blue 56 in tris(2-ethylhexyl)trimellitate (sometimes referred to for convenience as TET). Fifty ml of this solution was extracted 4 times with 40 ml of fresh DMSO. The TET/dye solution was sampled after each extraction and these samples were analyzed on a spectrophotometer. The concentrations of dye in the TET expressed on a percent weight/weight basis were:

| Sample | Concentration (dye/TET wt/wt) |
| --- | --- |
| INITIAL | 3.0% |
| 1 | 0.392% |
| 2 | 0.1254% |
| 3 | 0.0616% |
| 4 | 0.0084% |

The above data demonstrate repeated extraction of 50 ml. of the tris (2-ethylhexyl)trimellitate dispersion with 40 ml. portions of DMSO produced a dramatic reduction of dye concentration, down to a concentration of 0.0084% following only 4 extractions. Thus, a 300-fold reduction in dye concentration was obtained in four repeated extractions. Since repeated extractions should present no operational problems, it is believed that an extraction solvent that produces a four-fold or five-fold reduction of dyestuff concentration or better in a single extraction (assuming equal volumes of extraction solvent and TET will form economically) is adequately efficient.

Eleven dye composition extraction solvents were selected for testing based on the following four criteria:
(1) Ability to control chemical hazards.
(2) Probable ability to scour fabrics.
(3) Ability to be easily separated from the high-boiling, non-ionic media, in this case TET, and dye to allow for recycling.
(4) Commercial availability.

In addition to these eleven, dimethylformamide (DMF), dimethyl sulfoxide (DMSO), cyclohexanol and water were tested in order to gain a better understanding of dye solubility in solvents.

The qualitative solubility of TET in various solvents was evaluated by adding five grams of TET to 100 ml of the solvent being tested and determining if one or two phases existed. If only one phase existed then five more grams were added. This procedure was repeated until 15 grams had been added.

The solubility of dye in solvent was determined by gravimetric methods. A known mass of dye was placed in 100 ml of solvent and stirred on a stirring plate for approximately five minutes. The mixture was then filtered through a Whatman glass microfiber filter (934-AH) with an effective retention of 1.5 microns using a Buchner funnel. The mass of undissolved dye was determined and the amount dissolved was determined by difference. The dyes used were Red 91, Blue 56 and Yellow 3. All three were crude dyes.

The results of the solubility tests are presented in Table I. By far the best dye solubilities were exhibited by the aprotic solvents DMSO and DMF.

TABLE I

| SOLUBILITY OF TET AND DYE IN SOLVENTS | | | | |
| --- | --- | --- | --- | --- |
| NAME | TET (g/100 ml) | RED DYE (mg/ml) | BLUE DYE (mg/ml) | YELLOW DYE (mg/ml) |
| DMSO | <5 | 46.0 | 76.0 | 86.0 |
| DMF | >15 | 12.2 | 13.9 | 22.4 |
| MEK | >15 | 3.0 | 3.8 | 37.0 |
| Acetone | >15 | 2.9 | 3.5 | 30.0 |
| Methylene Chloride | >15 | 3.7 | 0.92 | 11.0 |
| Methyl acetate | >15 | 1.5 | 1.6 | 15.4 |
| Iso-propanol | >15 | 0.59 | 0.81 | 12.0 |
| Cyclohexanol | >15 | 0.47 | 1.0 | 10.3 |
| Toluene | >15 | 0.39 | 0.39 | 1.2 |
| 1,1,1-Trichloroethane | >15 | 0.48 | 0.47 | 4.3 |
| Methanol | <5 | 0.24 | 0.37 | 10.6 |
| n-Hexane | >15 | 0.20 | 0.86 | 0.15 |
| Freon TA | >15 | 0.22 | 0.39 | 2.2 |
| Water | <15 | 0.13 | — | 1.2 |
| Freon TF | >15 | 0.13 | — | 0.18 |

The results of these tests indicate that only DMSO, methanol and water are poor solvents for the TET. Of these, only DMSO is an effective solvent, at least for the dyes examined.

The cost savings of decolorizing waterless dye compositions using the process of the present invention with little or no use of activated carbon beds may be accessed by various parameters. The amount of dyestuff lost to the activated carbon bed-type decolorizing procedure may be readily determined. In addition, one must also consider the cost of the amount of dye-laden carbon that results from the activated carbon bed process. Included in this value is the amount of high-boiling nonionic medium that is also absorbed on the carbon. It is believed that a minimum of 500 gallons of waterless dye composition is required in order to make the decolorization procedure and stripping operation of the present invention economic. In addition to materials, there is also the calculation of the amount of energy required to circulate, heat and otherwise treat to decolorize the waterless dye composition. Equipment costs as well as labor are also factors to be considered. It has been determined that the overall method of stripping dyes from high-boiling non-ionic dyeing media as described herein has considerable cost advantages as compared with the conventional carbon bed decolorization procedure.

EQUIVALENTS

Those skilled in the art will recognize, or be able to ascertain using no more than routine experimentation, numerous equivalents to the specific procedures described herein. For example, the process of separating the two layers can be carried out by means of conventional centrifugation, by continuous countercurrent flow through a packed column, or by other means known to those skilled in the art. Such equivalents are considered to be within the scope of this invention, and are covered by the following claims.

What is claimed is:

1. A method of stripping dyes from waterless dye compositions comprising:
    (a) thoroughly mixing a waterless dye composition, containing at least one dye dissolved or dispersed in a high-boiling, nonionic liquid organic medium, with the extraction solvent dimethylsulfoxide that is essentially immiscible with the high-boiling, nonionic liquid organic medium and in which the dye is soluble;
    (b) allowing the mixture of step (a) to settle and separate into two distinct phases; and
    (c) removing the substantially completely decolorized high-boiling, nonionic liquid organic medium from the dye-laden extraction solvent.

2. The process of claim 1 in which the two phases in step (b) are separated by centrifugation.

3. The process of claim 1 in which the two distinct phases of step (b) are separated by continuous couterflow through a packed column.

4. The process of claim 1 in which the extraction solvent is distilled and the dye removed and recovered from the solvent.

5. The process of claim 1 in which the substantially completely decolorized high-boiling, nonionic liquid organic medium is passed over an activated charcoal bed and is further decolorized.

6. The process of claim 1 in which the high-boiling, nonionic liquid organic medium is an aromatic ester or a cycloaliphatic diester.

7. The process of claim 1 in which the cycloaliphatic diester is tris(2-ethylhexyl) trimellitate.

8. The process of claim 1 in which steps (a) and (b) are repeated at least twice.

9. A method of decolorizing waterless dye compositions comprising the successive steps of:
    (1) thoroughly mixing waterless dye composition containing a major amount of a high-boiling, nonionic liquid organic medium having dispersed or dissoved therein a tinctorial amount of a dye or pigment, and at least one extraction solvent in which the dye or pigment is substantially soluble and with which the liquid organic medium is substantially immiscible;
    (2) allowing the mixture of step (1) to settle and separate into two phases;
    (3) separating and recovering the decolorized high-boiling, nonionic liquid organic medium from the dye-laden extraction solvent.

10. A method of claim 9 in which the two phases in step (b) are separated by centrifugation.

11. A method of claim 9 in which the two distinct phases of step (b) are separated by continuous counterflow through a packed column, substantially completely decolorized high-boiling, nonionic medium from the dye carrying extraction solvent.

* * * * *

UNITED STATES PATENT AND TRADEMARK OFFICE
CERTIFICATE OF CORRECTION

PATENT NO. : 4,753,732

DATED : June 28, 1988

INVENTOR(S) : Davis et al

It is certified that error appears in the above-identified patent and that said Letters Patent is hereby corrected as shown below:

Column 1, line 36, after "of" delete "using";

Column 1, line 47, change "mixture" to --mixer--;

Column 1, line 55, change "prefered" to --preferred--;

Column 4, line 9, change "form" to --perform--;

Column 5, line 3, change "accessed" to --assessed--;

Column 6, line 30, change "dissoved" to --dissolved--;

Column 6, line 41, "(b)" should read --(2)--;

Column 6, line 43, "(b)" should read --(2)--;

Column 6, line 44 should read --flow through a packed column.--. The remainder of the claim, starting with the word "substantially" should be deleted.

Signed and Sealed this

Seventeenth Day of January, 1989

*Attest:*

DONALD J. QUIGG

*Attesting Officer*   *Commissioner of Patents and Trademarks*